(12) United States Patent
Lo

(10) Patent No.: US 7,823,805 B2
(45) Date of Patent: Nov. 2, 2010

(54) SPRAY GUN CAPABLE OF MIXING DETERGENT

(76) Inventor: Shun-Nan Lo, P.O. Box 215, Taichung (TW) 40099

( * ) Notice: Subject to any disclaimer, the term of this patent is extended or adjusted under 35 U.S.C. 154(b) by 113 days.

(21) Appl. No.: 12/232,624

(22) Filed: Sep. 22, 2008

(65) Prior Publication Data

US 2010/0072298 A1    Mar. 25, 2010

(51) Int. Cl.
*B05B 7/28* (2006.01)
*B05B 7/26* (2006.01)

(52) U.S. Cl. .................. 239/315; 239/74; 239/310; 239/317

(58) Field of Classification Search .................. 239/10, 239/74, 302, 310, 313, 315–318, 337, 340, 239/373, 375, 525, 530, 532, 569, 581.1, 239/590, 590.5
See application file for complete search history.

(56) References Cited

U.S. PATENT DOCUMENTS

| | | | | | |
|---|---|---|---|---|---|
| 2,764,452 | A | * | 9/1956 | Anderson et al. | 239/310 |
| 2,908,445 | A | * | 10/1959 | Schwartz | 239/317 |
| 6,164,496 | A | * | 12/2000 | Gregory | 222/144.5 |
| 6,572,032 | B2 | * | 6/2003 | Chih | 239/375 |
| 6,902,120 | B1 | * | 6/2005 | Chen | 239/310 |
| 6,964,380 | B1 | * | 11/2005 | Chen | 239/315 |
| 6,966,503 | B1 | * | 11/2005 | Chen | 239/310 |

* cited by examiner

*Primary Examiner*—Darren W Gorman

(57) ABSTRACT

A spray gun capable of mixing detergent includes a detergent tube having a water guiding tube passing through its upper cover, an interior tube fixedly connected to its bottom having a horizontal water inlet communicating with the detergent tube; a separate tube fixedly put between the interior tube and the adjustment tube for connection, an upper end of the separate tube connected to the water guiding tube, an inside of the separate tube partitioned by a partition wall to form an upper tube hole and a lower tube hole, an upper end of the upper tube hole having a detergent guiding inlet, a bottom of the upper tube hole having a water guiding inlet, the lower tube hole connected to a water source, an upper end of the lower tube hole having a water outlet; and an adjustment tube having an upper extension tube for putting the interior tub.

14 Claims, 12 Drawing Sheets

SPRAY GUN CAPABLE OF MIXING DETERGENT

FIELD OF THE INVENTION

The present invention relates to a spray gun, and more particularly to a spray gun capable of mixing detergent that fills with detergent, adjusts the inflow of mixing detergent into water or completely closing detergent guided to water.

BACKGROUND OF THE INVENTION

According to U.S. Pat. No. 6,964,380, entitled as "Spraying gun having flow rate control effect", an end of a detergent tube 4 is connected to a connecting member 3. A water outlet conduit 41 of the detergent tube 4 is closely put to a water passage 32 of the connecting member 3. The connecting member 3 has a mounting portion 31 for connecting a water inlet connector 1 after passing through a through hole 25 of an adjusting member 2. An inside of the mounting portion 31 has a water dividing bar 35 capable of communicating with the water passage 32. A top of the mounting portion 31 has a water inlet hole 34 horizontally passing through. A periphery of the water passage 32 of the connecting member 3 has a detergent channel 37 communicating with a detergent conduit 42. The periphery of the mounting portion 31 of the connecting member 3 has two detergent passages 36 for communicating with the detergent channel 37. The inside of the adjusting member 2 has a catch portion 24. The catch portion 24 has two detergent holes 26 for aligning the two detergent passages 36. A receiving recess 27 is formed on an upper end of the catch portion 24, and provided for containing the connecting member 3. A corresponding side of an internal wall of the catch portion 24 has a plurality of elongated recessed water connecting portions 23 and a stop edge 22. The inside of the water inlet connector 1 has a horizontal sealing wall so as to partition a water inlet chamber 12 for connecting a water source and a mounting recess 15 for connecting the mounting portion 31 of the connecting member 3. An upper side of the water inlet chamber 12 of the water inlet connector 1 has a water outlet hole 13. An external surface of the water outlet hole 13 is adjusted and driven to closely attach the stop edge 22 of the adjusting member 2 or the plurality of elongated recessed water connecting portions 23 by rotating the adjusting member 2.

When the water outlet hole of the water inlet connector is at the plurality of elongated recessed water connecting portions via the rotation of the adjusting member, the water source is guided through the water inlet hole of the connecting member, and then enters into the water passage from the water dividing bar, and finally connected to the water outlet conduit of the detergent tube to directly guide water. In the meanwhile, If the two detergent passages of the connecting member corresponding to the two detergent holes of the adjusting member is synchronously adjusted, a portion of water can be guided into the inside of the detergent tube through the detergent passages and the detergent holes so as to mix with detergent. Water then is guided to flow into the water inlet hole from the original inlet and outlet.

However, the drawbacks of the foregoing structure are that the sequence of inflow and outflow is not planned after the two detergent passages of the connecting member correspond to the two detergent holes of the adjusting member. Consequently, after water enters into the two detergent holes of the adjusting member simultaneously, water may not be effectively guided into the detergent tube, and detergent may not be guided via the detergent holes from the detergent tube as well. The structure is an ineffective design.

Accordingly, to overcome the foregoing shortcomings, the inventor(s) of the present invention based on years of experience in the related field to conduct extensive researches and experiments, and finally invented a spray gun capable of mixing detergent.

SUMMARY OF THE INVENTION

A primary objective of the present invention is to provide a spray gun capable of filling detergent, and adjusting the inflow of guiding water and the detergent tube to mix with water for spraying.

To achieve the foregoing objective, the present invention provides a spray gun capable of mixing detergent. The spray gun includes a detergent tube, an upper end of the detergent tube fixedly connected to an upper cover, a bottom of the detergent tube fixedly connected to an interior tube having a horizontal water inlet communicating with the detergent tube; a separate tube, an upper section of the separate tube put to a tube hole of the interior tube, an upper end of the separate tube connected to a water guiding tube, the water guiding tube extended from a central circular hole of the upper cover, an inside of the separate partitioned by a partition wall to form an upper tube hole and a lower tube hole, an upper end of the upper tube hole having a detergent guiding inlet, a bottom of the upper tube hole having a water guiding inlet, the lower tube hole connected to a water source, an upper end of the lower tube hole having a water outlet; and an adjustment tube having an upper extension tube put to the interior tube, its tube hole for putting a lower section of the separate tube, a tube wall of a bottom of the tube hole having a plurality of long concave grooves and a plurality of short concave grooves, a corresponding side wall of the upper extension tube having an upper water inlet corresponding to the detergent guiding inlet of the separate tube and a lower water outlet corresponding to the horizontal water inlet of the interior tube. By assembling the foregoing components, the closing of the water source is controlled, or water is guided from the water guiding tube, or water mixed with detergent is guided from the water guiding tube through the rotating of the adjustment tube.

Other features and advantages of the present invention and variations thereof will become apparent from the following description, drawings, and claims.

DETAILED DESCRIPTION OF THE PREFERRED EMBODIMENTS

Figure 1:
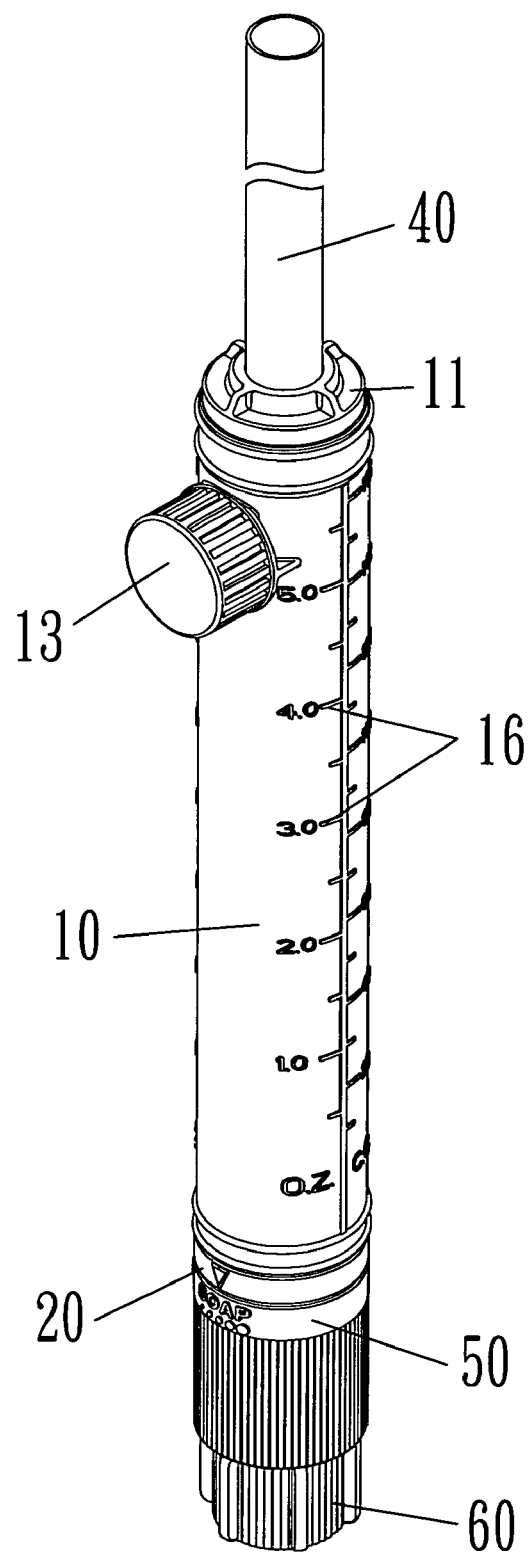
FIG. 1 is a three-dimensional assembly drawing of a spray gun according to a preferred embodiment of the present invention.
Figure 2:
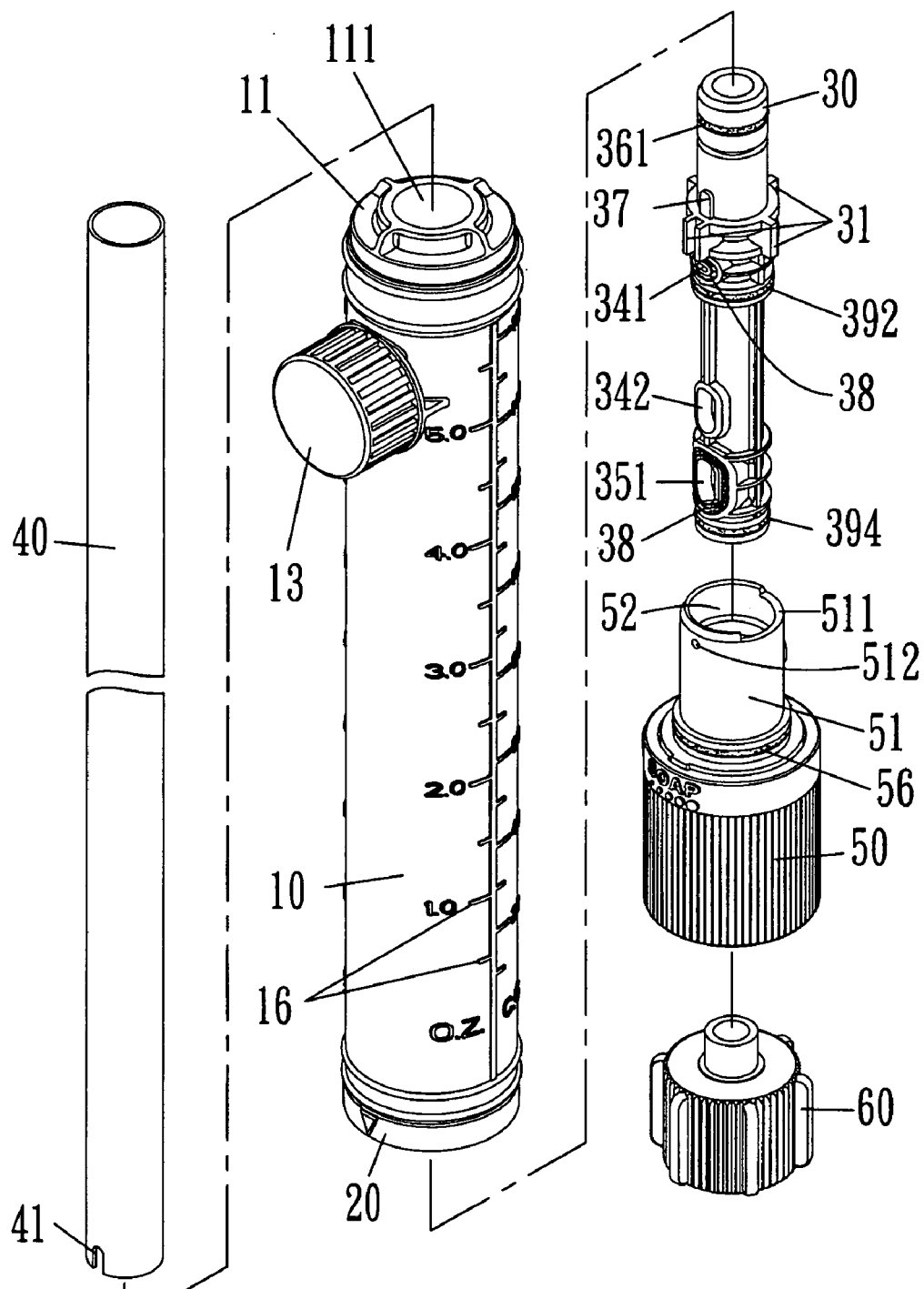
FIG. 2 is a decomposition drawing of a spray gun according to a preferred embodiment of the present invention.
Figure 3:
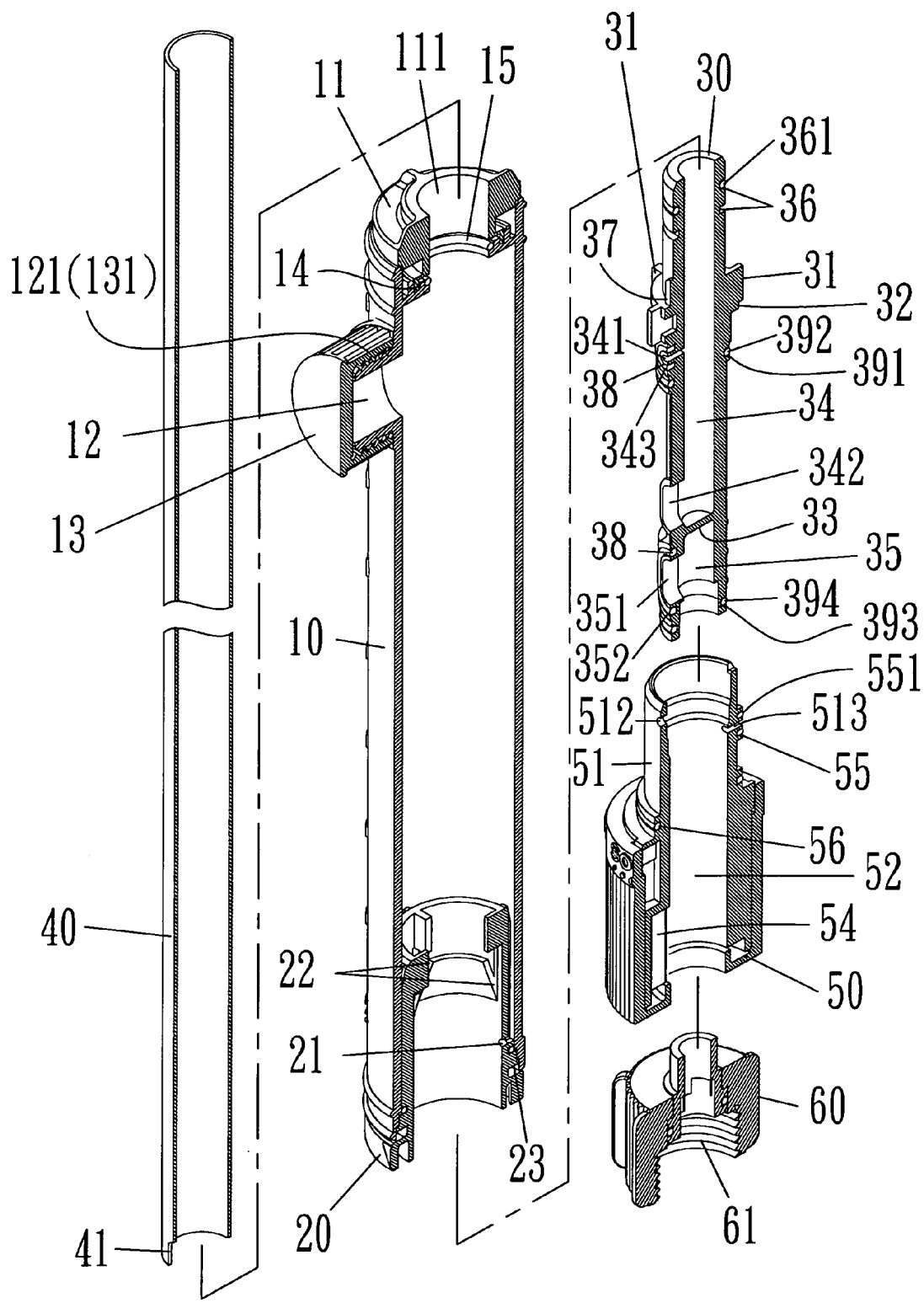
FIG. 3 is a cross-sectional drawing of a spray gun according to a preferred embodiment of the present invention.
Figure 4:
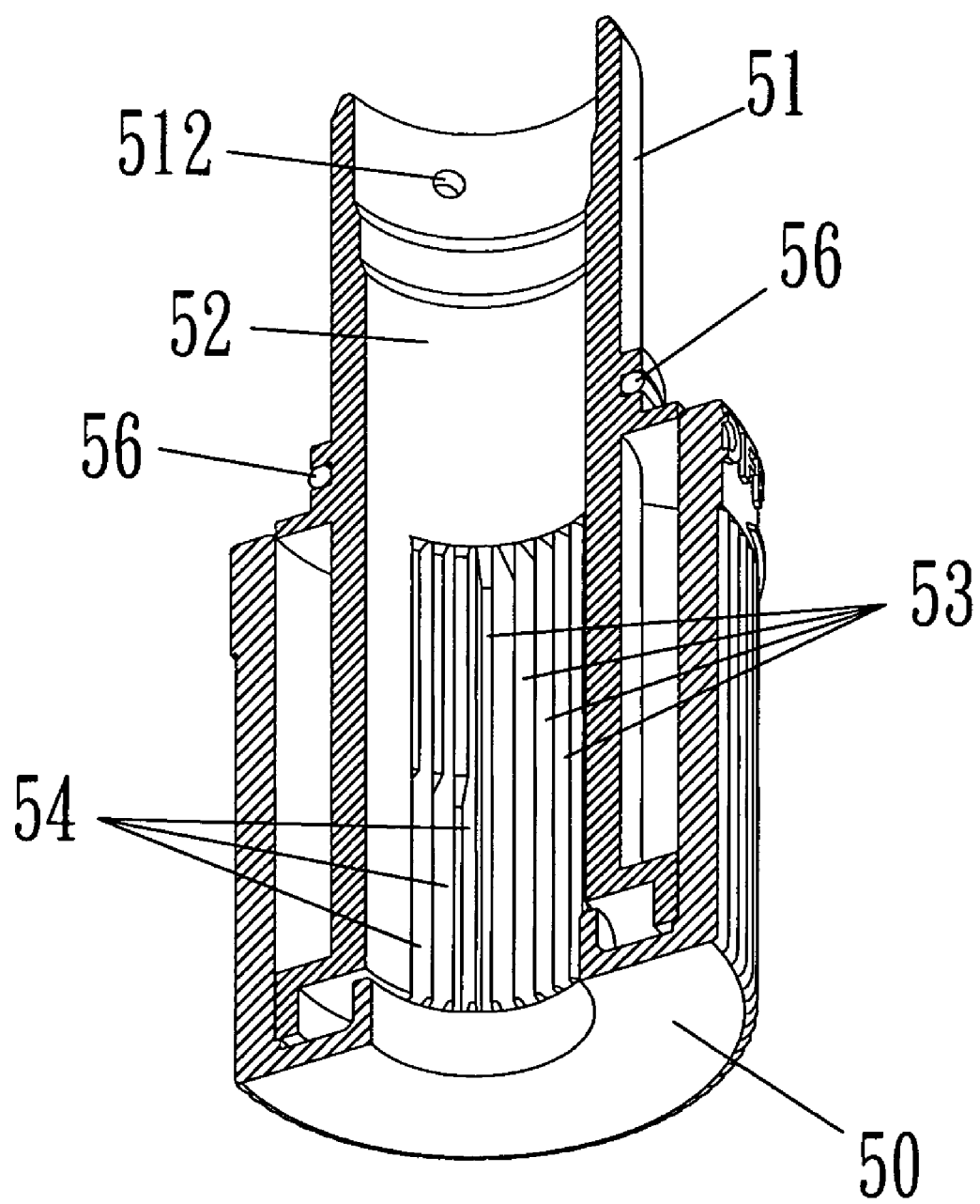
FIG. 4 is a cross-sectional drawing of an adjustment tube of a spray gun according to a preferred embodiment of the present invention.
Figure 5:
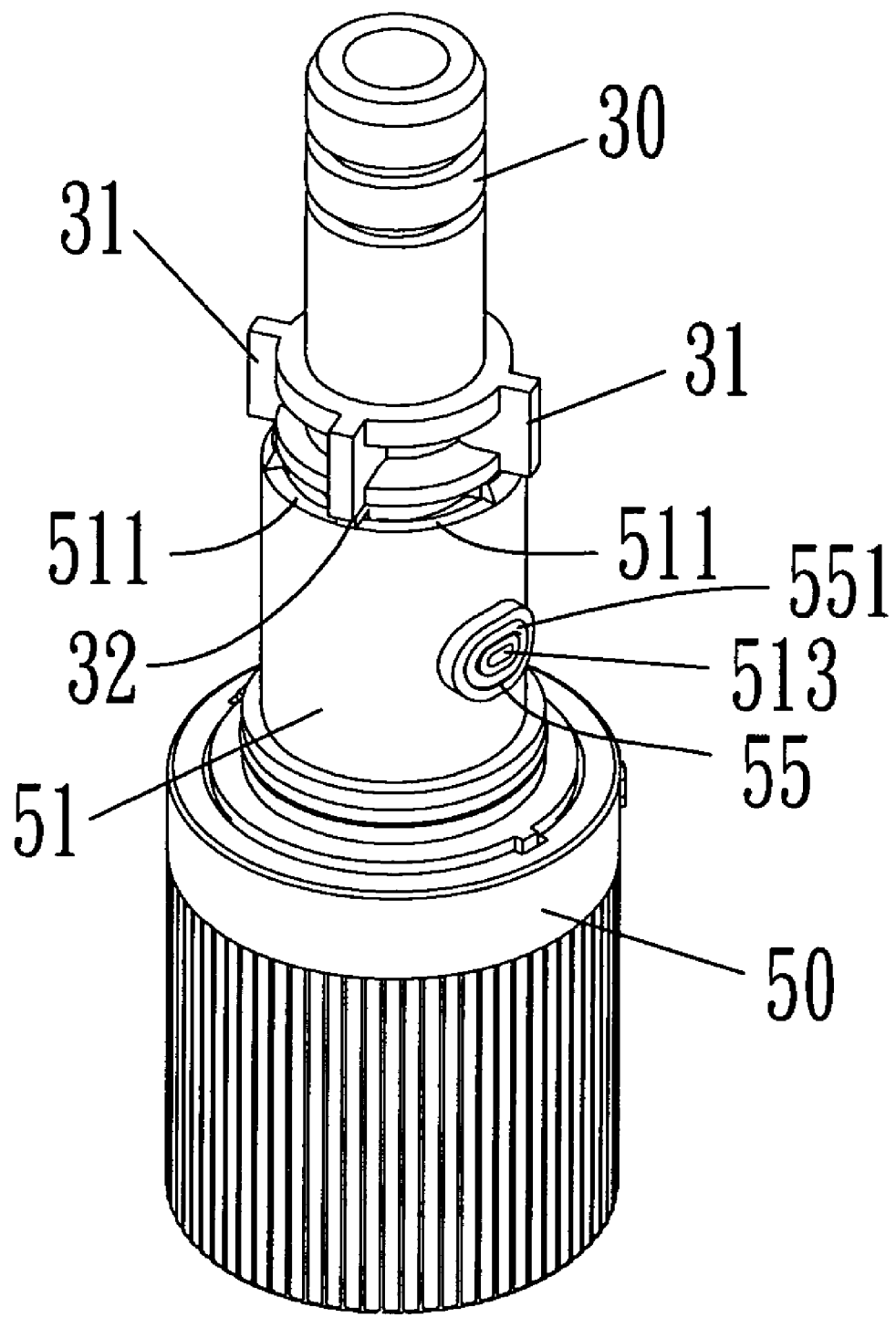
FIG. 5 is an assembly drawing of a separate tube and an adjustment tube according to a preferred embodiment of the present invention.
Figure 6:
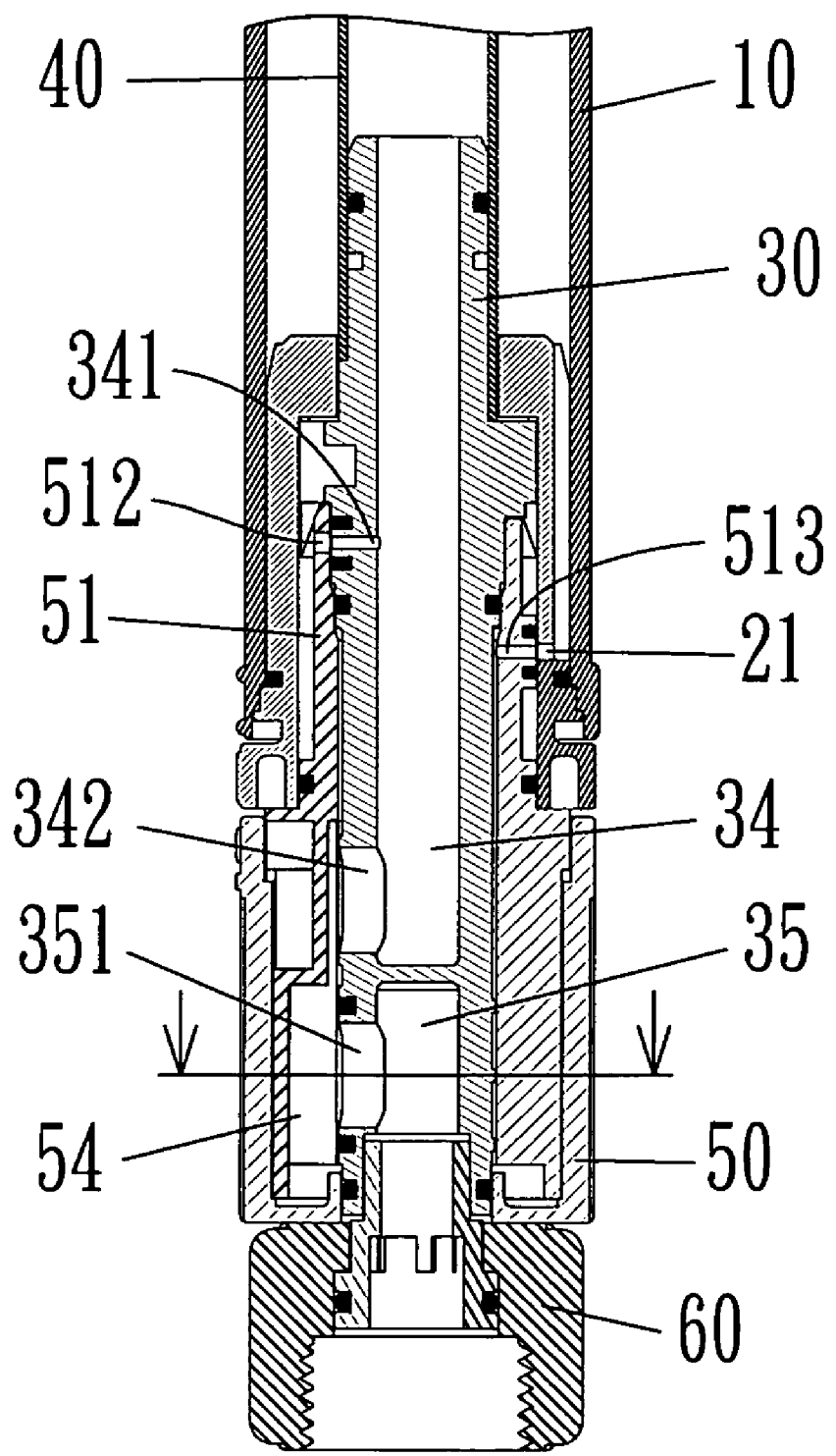
FIG. 6 is a part sectional drawing of a spray gun according to FIG. 1.

Other features and advantages of the present invention will become apparent from the following description of the invention which refers to the accompanying drawings.

Please refer to FIG. 1 to FIG. 12, a spray gun capable of mixing detergent of the present invention is disclosed. The spray gun includes a detergent tube 10, a separate tube 30 and an adjustment tube 50. An upper end of the detergent tube 10 includes an upper cover 11 having a central circular hole 111. A bottom of the detergent tube 10 is fixedly connected to an interior tube 20. An external diameter of the interior tube 20 is smaller than an internal diameter of the detergent tube 10. A side wall of the interior tube 20 has a horizontal water inlet 21. An inside of the tube hole of the interior tube 20 has a plurality of notches 22.

An upper section of the separate tube 30 can be put to the inside of the tube hole of the interior tube 20. An upper end of the separate tube 30 is connected to a water guiding tube 40. The water guiding tube 40 protrudes from the central circular hole 111 of the upper cover 11. A periphery of an upper section of the separate tube 30 has a plurality of protruding tenons 31 for inserting the plurality of notches 22 as positioning status. A predetermined place of a periphery of the separate tube 30 has a limit plate 32. In addition, an inside of the separate tube 30 has a partition wall 33 for partitioning the separate tube 30 into an upper tube hole 34 and a lower tube hole 35. An upper end of the upper tube hole 34 has a detergent guiding inlet 341. A bottom of the upper tube hole 34 has a water guiding inlet 342. The lower tube hole 35 is connected to a water source. An upper end of the lower tube hole 35 has a water outlet 351.

The adjustment tube 50 has an upper extension tube 51 that is put to the interior tube 20. The tube hole 52 of the upper extension tube 51 is extended to a bottom of the adjustment tube 50 as penetration status. A partial area of an internal wall of the tube hole 52 of the adjustment tube 50 has a plurality of long concave grooves 53 and a plurality of short concave grooves 54 that are arranged and spaced at interval. A limit concave notch 511 is disposed along a top tube wall of the upper extension tube 51. A corresponding side wall of the upper extension tube 51 has an upper water inlet 512 corresponding to the detergent guiding inlet 341 of the separate tube 30 and a lower water outlet 513 corresponding to the horizontal water inlet 21 of the interior tube 20 respectively.

A lower section of the separate tube 30 is put to the tube hole 52 of the adjustment tube 50 so that the bottom of the separate tube 30 and the bottom of the adjustment tube 50 can be at the same plane, and the limit plate 32 of the separate tube 30 can be put to the limit concave notch 511, thereby limiting the rotating range performed by the adjustment tube 50. The water outlet 351 and the water guiding inlet 342 can correspond to the long concave grooves 53 and the short concave grooves 54 or an internal wall of the sealed tube hole 52. An external diameter of the upper extension tube 51 is slightly smaller than a tube hole of the interior tube 20. An external periphery of the lower water outlet 513 has a water stop ring 551 capable of closely attaching to an internal wall of the tube hole of the interior tube 20.

Figure 7:
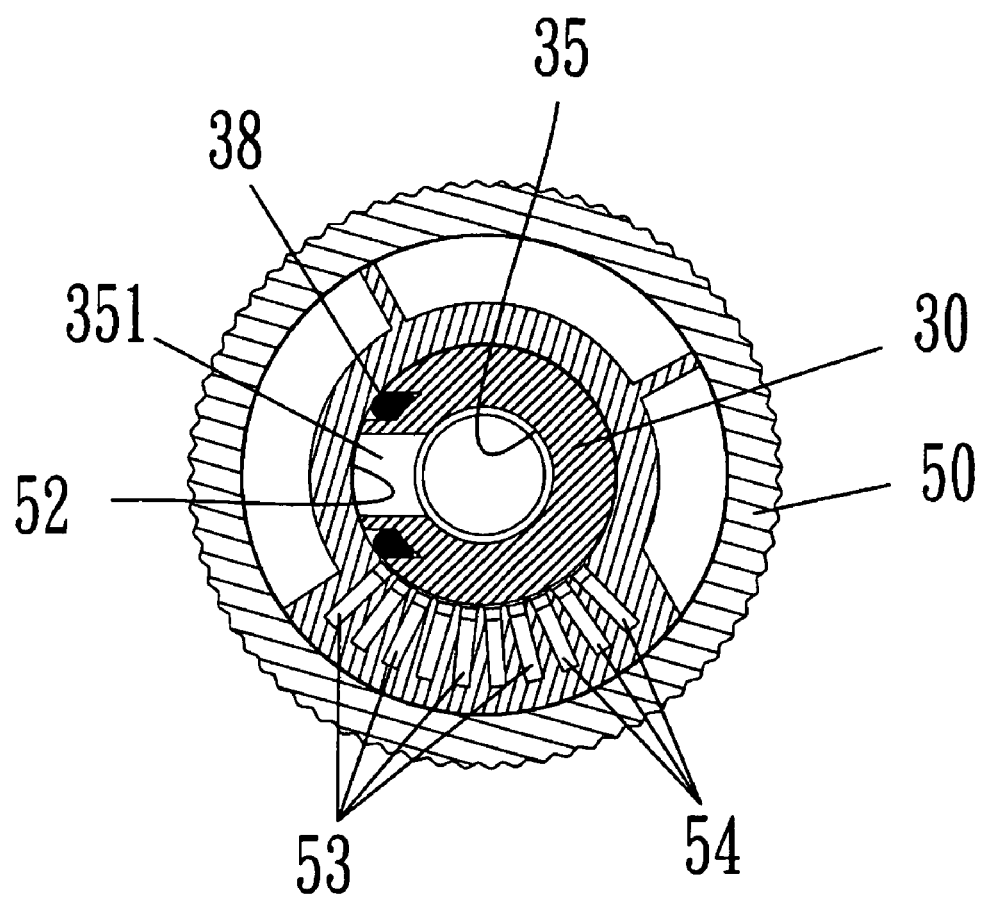
FIG. 7 is an assembly drawing of a spray gun according to a preferred embodiment of the present invention, as a transverse section drawing of a water outlet in closing status after rotating the adjustment tube.
Figure 8:
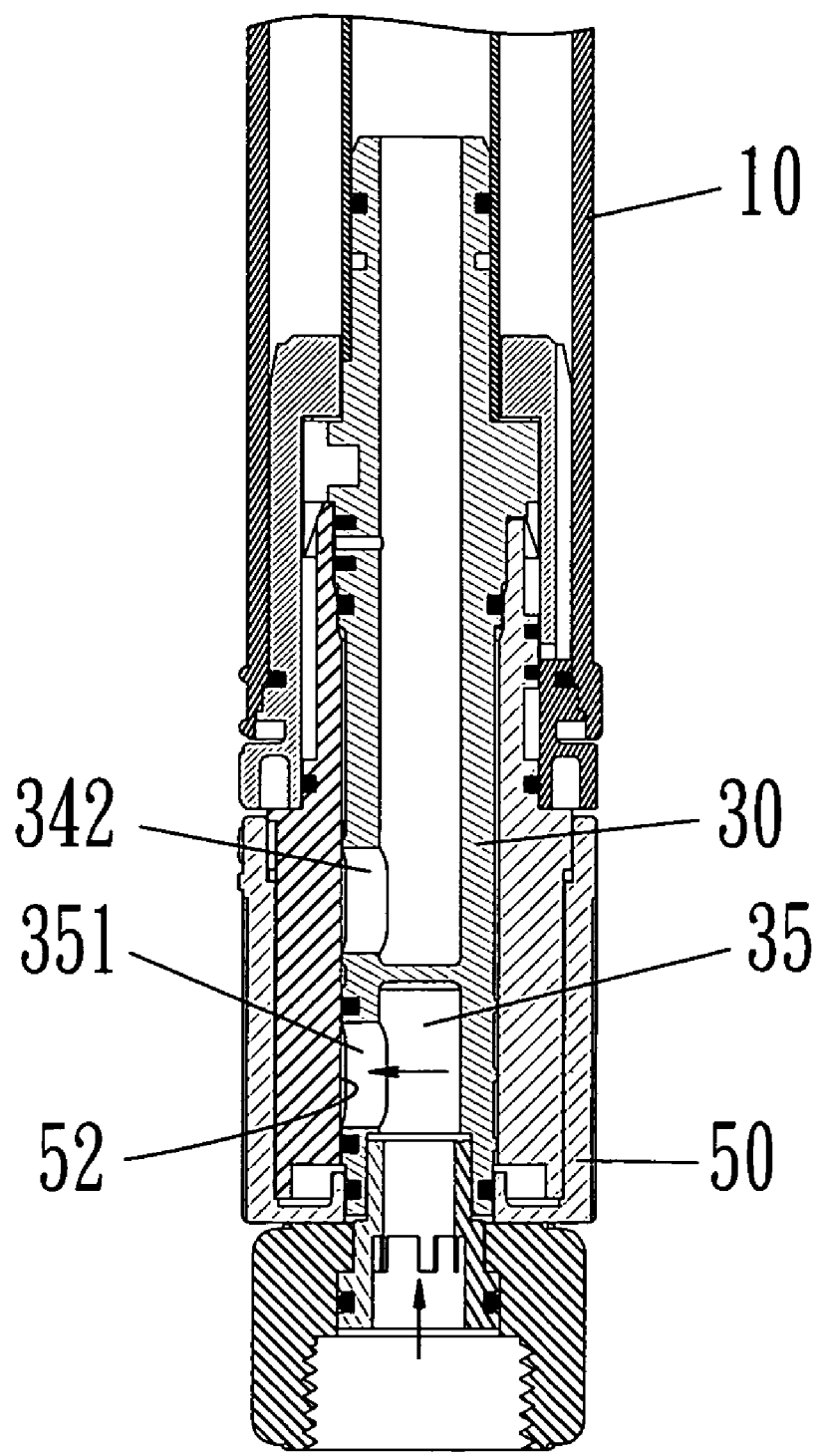
FIG. 8 is a front section drawing according to FIG. 7.
Figure 9:
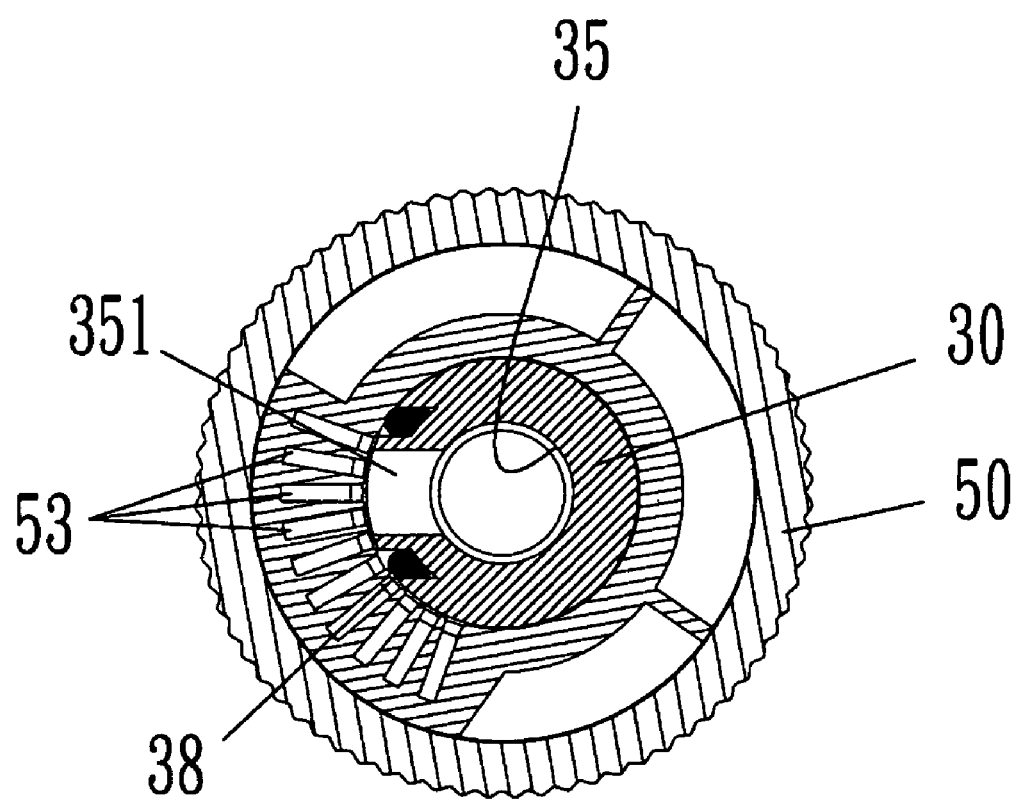
FIG. 9 is an assembly drawing of a spray gun according to a preferred embodiment of the present invention, as a transverse section drawing of a water outlet at the long concave grooves after rotating the adjustment tube.
Figure 10:
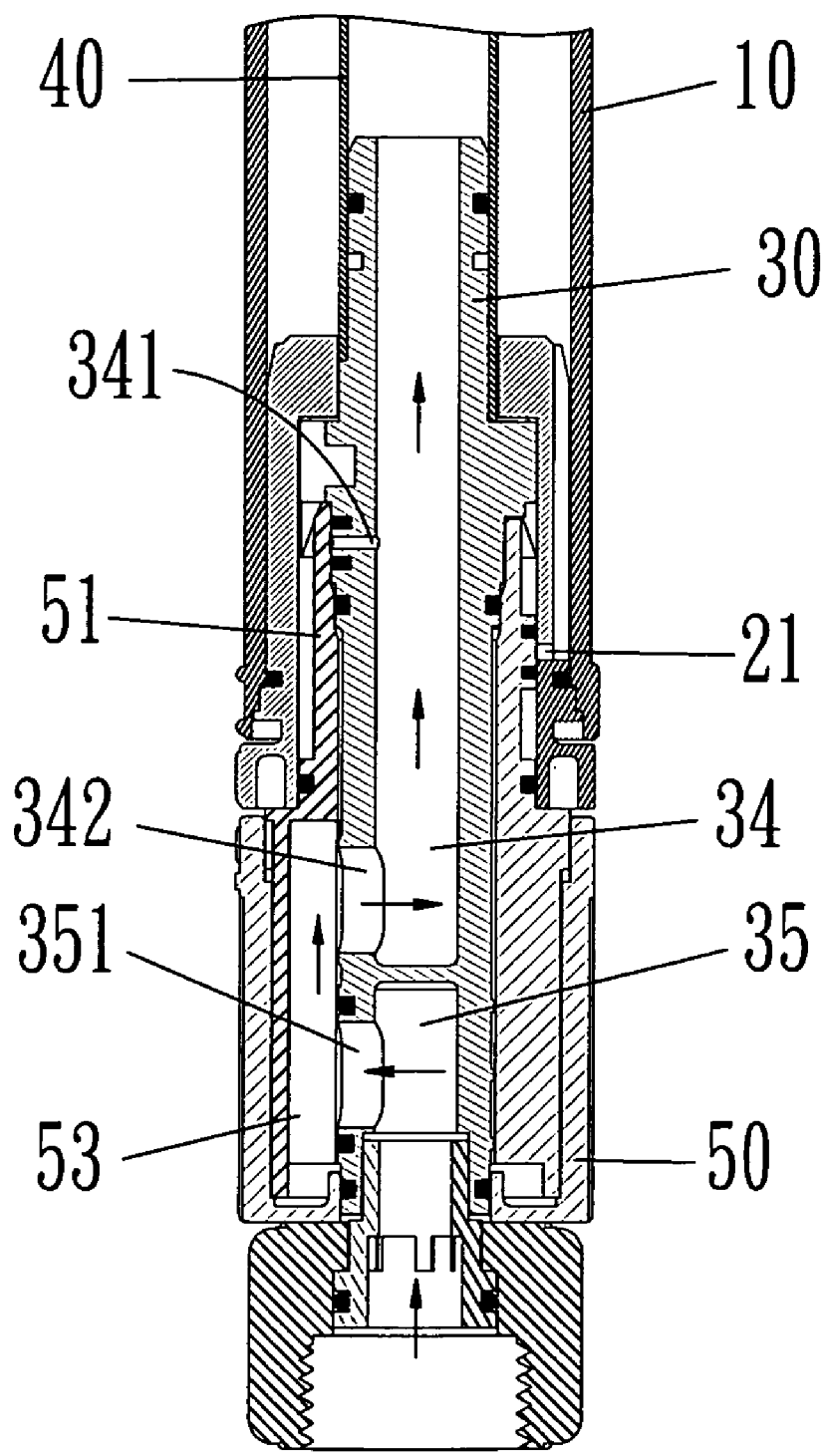
FIG. 10 is a front section drawing according to FIG. 9.
Figure 11:
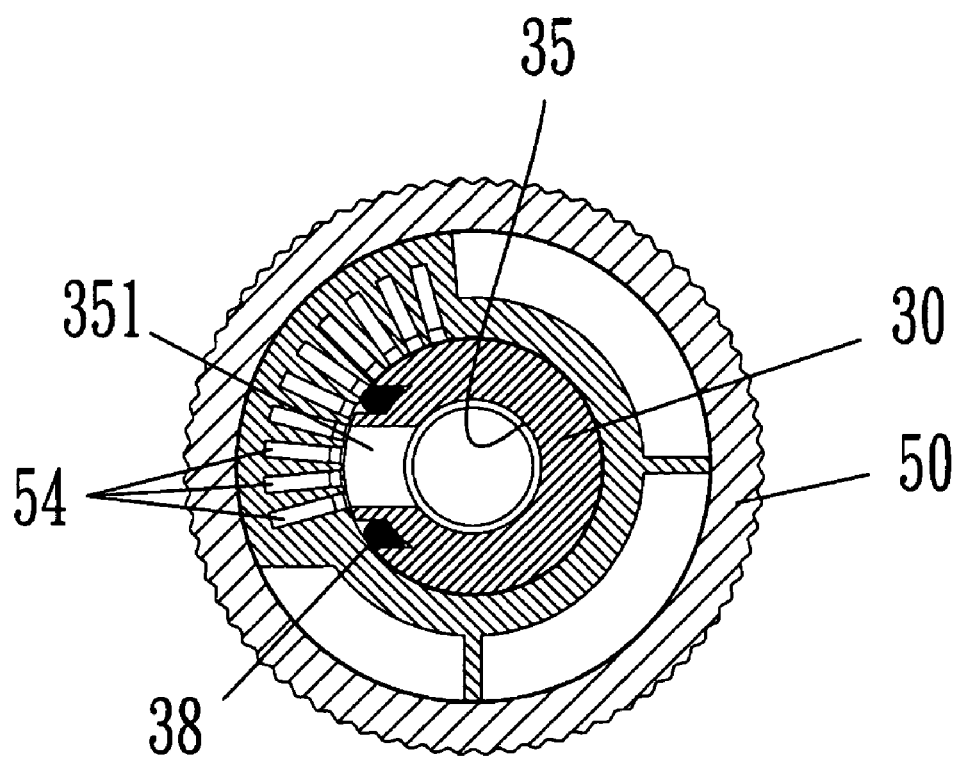
FIG. 11 is an assembly drawing of a spray gun according to a preferred embodiment of the present invention, as a transverse section drawing of a water outlet at the short concave grooves after rotating the adjustment tube.
Figure 12:
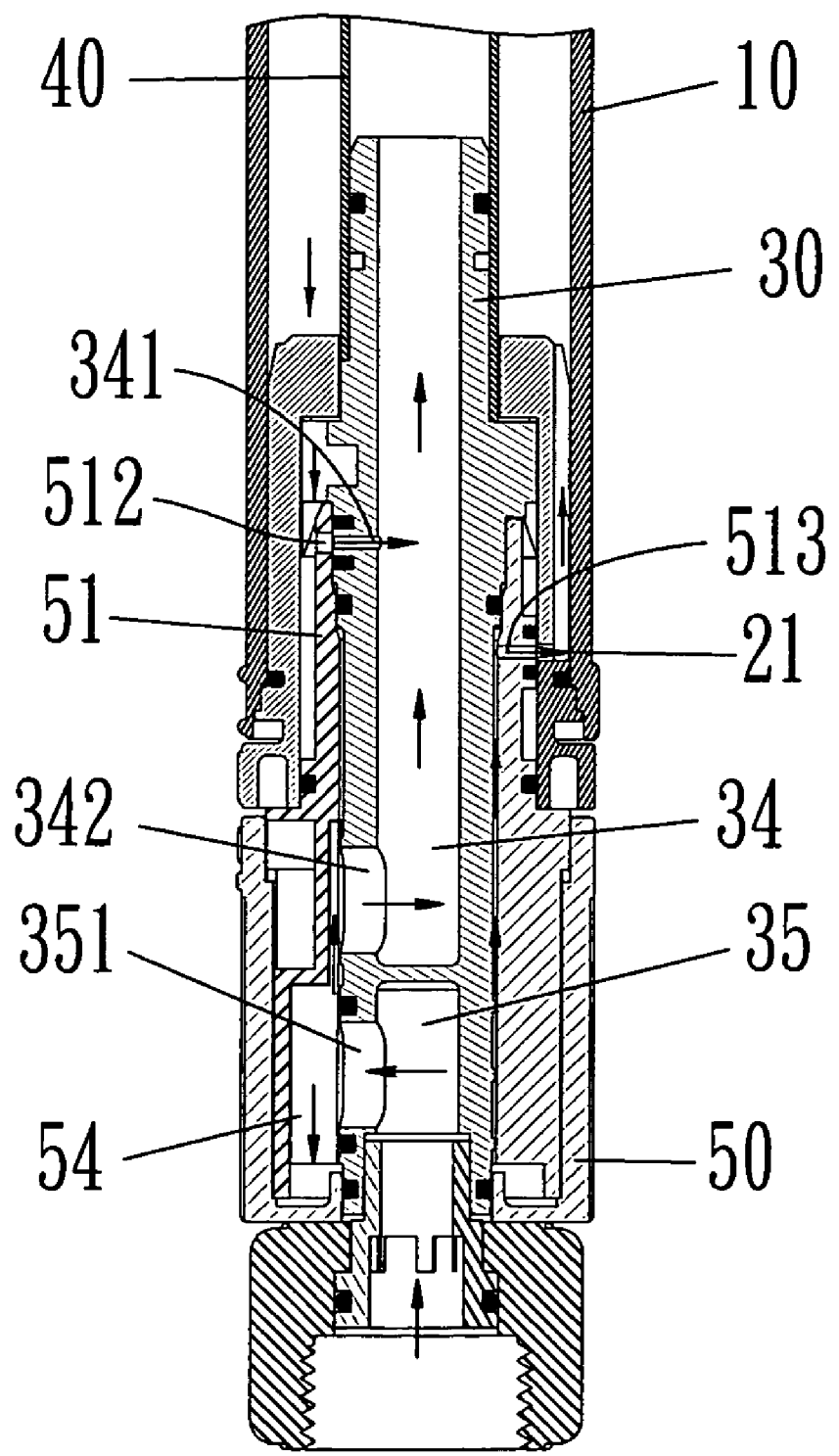
FIG. 12 is a front section drawing according to FIG. 11.

By assembling the foregoing components, the closing of the water source is controlled, or water is guided from the water guiding tube, or water mixed with detergent is guided from the water guiding tube through the rotating of the adjustment tube 50. Firstly, after the lower tube hole 35 of the separate tube 30 is connected to the water source, the adjustment tube 50 is continuously rotated to allow the water outlet 351 and the water guiding inlet 342 of a lower end of the separate tube 30 corresponding to a sealed internal wall of the tube hole 52 of the adjustment tube 50. Water of flowing into the spray gun of the present invention can be completely blocked (as shown in FIG. 7 and FIG. 8). When the water outlet 351 and the water guiding inlet 342 enter the long concave grooves 53 by continuously rotating the adjustment tube 50, the detergent guiding inlet 341 of the separate tube 40 is still attached to an internal wall of the tube hole 52 of the adjustment tube 50, and the lower water outlet 513 of the adjustment tube 50 is also attached to an internal wall of the tube hole of the interior tube 20. Water merely flows into the long concave grooves 53 of the adjustment tube via the water outlet 351 from the lower tube hole 35 of the separate tube 30, and circumrotates into the upper tube hole 34 from the water guiding inlet 342 of the separate tube 30, and flows to the water guiding tube 40 (as shown in FIG. 9 and FIG. 10). Accordingly, by continuously rotating the adjustment tube 50, when the water outlet 513 corresponds to the water guiding inlet 342 at the short concave grooves 54 to allow the detergent guiding inlet 341 of the separate tube 30 to communicate with the upper water inlet 512 of the adjustment tube 50 so that the lower water outlet 513 of the adjustment tube 50 can communicate with the horizontal water inlet 21 of the interior tube 20. Therefore, after water enters into the short concave grooves 54 of the adjustment tube 50 via the water outlet 351 from the lower tube hole 35 of the separate tube 30, most water flows upwardly from the lower section of the short concave grooves 54 so that a portion of water can flow into the upper tube hole 34 of the water guiding inlet 342. Another portion of water is guided into the detergent tube 10 from the lower water outlet 513 of the adjustment tube 50 and the horizontal water inlet 21 of the interior tube 20 so that after mixing with detergent, water then is guided to the upper tube hole 34 from the upper water inlet 512 of the adjustment tube 50 and the detergent guiding inlet 341 of the separate tube 30 (as shown in FIG. 11 and FIG. 12).

Continuously, the feature of each component and the motion relationship of the relative position of assembling each component are further illustrated in detail.

First, in addition to the foregoing features, an injection inlet 12 is extended from a side of the detergent tube 10. Detergent can be injected into the detergent tube 10 from the injection inlet 12. An external thread section 121 is formed to an external of the injection inlet 12, and screwed with a sealing cover 13 having an internal thread section 131. The injection inlet 12 therefore can be sealed. The upper cover 11 and the interior tube 20 in the embodiment are closely connected to the detergent tube 10 through glue. Alternately, any conventional manner of fixedly connecting the upper cover 10, the interior tube 20 and the detergent tube 10 can be utilized. A protruding ring 14 is formed near the upper end of the detergent tube 10. A water stop ring 15 is put to the protruding ring 14. When the water guiding tube 40 is put through the protruding ring 14, the water stop ring 15 can be disposed between the protruding ring 14 and the water guiding tube 40 to prevent water from leaking. A periphery of the detergent tube 10 has a gauge 16 for clearly showing the detergent content filled in the detergent tube 10.

An external protruding ring 23 is formed near the bottom edge of the interior tube 20, and provided for closely attaching the tube hole of the detergent tube 10. The plurality of notches 22 inside the interior tube 20 in the embodiment shows the cross arrangement. The plurality of protruding tenons 31 of the separate tube 30 also shows the cross arrangement. Accordingly, the plurality of tenons 31 can be inserted into the plurality of notches 22 to assemble and connect as a whole.

An upper section of the separate tube 30 can be put to the tube hole of the water guiding tube 40. An upper end of the separate tube 30 has at least one upper concave notch 36. An upper water stop ring 361 is put on the upper concave notch 36. A periphery of the upper water stop ring 361 can be closely attached to the inside of the tube hole of the water guiding tube 40 to prevent detergent from being permeated into the water guiding tube 40. Moreover, to accurately connect the water guiding tube 40 and the separate tube 30 without any release, a protruding ear 37 is disposed to an external wall of an upper end of the separate tube 30. A notch 41 capable of corresponding to the protruding ear 37 is opened to a tube wall of a bottom of the water guiding tube 40 in order to position the protruding ear 37. In addition, an external periphery of the detergent guiding inlet 341 and the water outlet 351 of the separate tube 30 has side ring grooves 343 and 352 respectively. Side water stop rings 38 are put in the side ring grooves 343 and 352. A lower periphery of the detergent guiding inlet 341 and the water outlet 351 of the separate tube 30 has a middle ring cavity 391 and a lower ring cavity 393. A middle water stop ring 392 is put to the middle ring cavity 391. A lower water stop ring 394 is put to the lower ring cavity 393. The middle water stop ring 392 and the lower water stop ring 394 are provided for leaning against the internal wall of the tube hole 52 of the adjustment tube 50. Accordingly, two independent flow paths can be divided by utilizing the middle water stop ring 392 and the lower water stop ring 394 disposed to the periphery of the separate tube 30 leaning against the internal wall of the tube hole 52 of the adjustment tube 50 so that detergent filled in the detergent tube 10 is merely guided by a predetermined path as the detergent guiding inlet 341. Detergent my not permeate into the lower flow path via the water guiding inlet 342. An external diameter of the separate tube 30 is slightly smaller than an internal diameter of the tube hole 52 of the adjustment tube 50. A circular water channel is formed between the external diameter of the separate tube 30 and the tube hole 52 of the adjustment tube 50.

A partial area of an internal wall of the tube hole 52 of the adjustment tube 50 has a plurality of long concave grooves 53 and a plurality of short concave grooves 54. The sun of all grooves is a quarter diameter of the tube hole 52. In addition, a ring notch 55 is surrounded to an external periphery of the lower water outlet 513 of the adjustment tube 50. A water stop ring 551 is disposed in the ring notch 55 to closely attach an internal wall of the tube hole of the interior tube 20. In addition, another water stop ring 56 is disposed between the interior tube 20 and an external tube wall of a bottom of the upper extension tube 51 of the adjustment tube 50.

A water connection tube 60 having an internal thread hole 61 is connected to a bottom of the separate tube 30 to externally connect the water source. An end of the water connection tube 60 can lean against a bottom of the adjustment tube 50.

Although the features and advantages of the embodiments according to the preferred invention are disclosed, it is not limited to the embodiments described above, but encompasses any and all modifications and changes within the spirit and scope of the following claims.

What is claimed is:

1. A spray gun capable of mixing detergent, comprising:
    a detergent tube having a water guiding tube passing through an upper cover of the detergent tube, a bottom of the detergent tube fixedly connected to an interior tube having a horizontal water inlet communicating with the detergent tube;
    a separate tube fixedly put between the interior tube and an adjustment tube for connection, an upper end of the separate tube connected to the water guiding tube, an inside of the separate tube partitioned by a partition wall to form an upper tube hole and a lower tube hole, an upper end of the upper tube hole having a detergent guiding inlet, a bottom of the upper tube hole having a water guiding inlet, the lower tube hole connected to a water source, an upper end of the lower tube hole having a water outlet;
    the adjustment tube having an upper extension tube put to the interior tube, a tube wall of a bottom of a tube hole of the adjustment tube having a plurality of long concave grooves and a plurality of short concave grooves, a corresponding side wall of the upper extension tube having an upper water inlet corresponding to the detergent guiding inlet of the separate tube and a lower water outlet corresponding to the horizontal water inlet of the interior tube respectively; so that the water source is closed, or water is guided from the water guiding tube, or water mixed with detergent is guided from the water guiding tube by rotating the adjustment tube.

2. The spray gun capable of mixing detergent as claimed in claim 1, wherein an external diameter of the interior tube is smaller than an internal diameter of the detergent tube.

3. The spray gun capable of mixing detergent as claimed in claim 1, wherein an inside of a tube hole of the interior tube has a plurality of notches, and a periphery of an upper section of the separate tube has a plurality of protruding tenons for inserting into the plurality of notches as positioning status.

4. The spray gun capable of mixing detergent as claimed in claim 1, wherein a predetermined periphery of the separate tube has a limit plate, and the adjustment tube has a limit concave notch along a top tube wall of the upper extension tube, and the limit concave notch is put by the limit plate to limit a rotation range performed by the adjustment tube.

5. The spray gun capable of mixing detergent as claimed in claim 1, wherein after a lower section of the separate tube is put to the tube hole of the adjustment tube, a bottom of the separate tube and a bottom of the adjustment tube are at the same plane.

6. The spray gun capable of mixing detergent as claimed in claim 1, wherein the water outlet and the water guiding inlet of the separate tube are assembled to the tube hole of the adjustment tube such that the long grooves or the short grooves or any place of an internal wall of the tube hole of the adjustment tube can correspond to the water outlet and the water guiding inlet.

7. A spray gun capable of mixing detergent, comprising:
    a detergent tube, an internal bottom of the detergent tube fixedly connected to an interior tube having a horizontal water inlet and communicating with the detergent tube;
    a separate tube, an upper end of the separate tube connected to the interior tube, an internal partitioned to form an upper tube hole and a lower tube hole, an upper end of the upper tube hole having a detergent guiding inlet, a bottom of the upper tube hole having a water guiding inlet, the lower tube hole connected to a water source, an upper end of the lower tube hole having a water outlet;

an adjustment tube, an upper end of the adjustment tube having an upper extension tube put to the interior tube, a tube wall of a bottom of a tube hole of the adjustment tube having a plurality of long concave grooves and a plurality of short concave grooves for corresponding to the water guiding inlet and the water outlet, the upper extension tube having an upper water inlet for corresponding to the detergent guiding inlet of the separate tube and a lower water outlet for corresponding to the horizontal water inlet of the interior tube respectively.

8. The spray gun capable of mixing detergent as claimed in claim 1 or 7, wherein an external diameter of the upper extension tube of the adjustment tube is slightly smaller than a tube hole of the interior tube, and an external periphery of the lower water outlet has a water stop ring capable of closely pasting an internal wall of the tube hole of the interior tube.

9. The spray gun capable of mixing detergent as claimed in claim 1 or 7, wherein a side of the detergent tube has an injection inlet, and an external of the injection inlet forms an external thread section, and is screwed with a sealing cover having an internal thread section.

10. The spray gun capable of mixing detergent as claimed in claim 1 or 7, wherein peripheries of the detergent guiding inlet and the water outlet of the separate tube have side ring grooves, and an internal of the side ring grooves has a side water stop ring for pasting an internal wall of the tube hole of the adjustment tube.

11. The spray gun capable of mixing detergent as claimed in claim 1 or 7, wherein a lower external of the detergent guiding inlet and a lower external of the water outlet of the separate tube have a middle ring cavity and a lower ring cavity respectively, and an internal of the middle ring cavity has a middle water stop ring, and an internal of the lower ring cavity has a lower water stop ring, and the middle water stop ring and the lower water stop ring are provided for leaning against an internal wall of the tube hole of the adjustment tube.

12. The spray gun capable of mixing detergent as claimed in claim 1 or 7, wherein an external diameter of the separate tube is smaller than an internal diameter of the tube hole of the adjustment tube so as to form a ring-type water channel between the external diameter of the separate tube and the tube hole of the adjustment tube.

13. The spray gun capable of mixing detergent as claimed in claim 1 or 7, wherein the plurality of long concave grooves and the plurality of short concave grooves are disposed to a partial area of an internal wall of the tube hole of the adjustment tube, and all grooves are a quarter diameter of the tube hole.

14. The spray gun capable of mixing detergent as claimed in claim 1 or 7, wherein a bottom of the separate tube is connected to an inlet connection tube having an internal screw hole.

* * * * *